Jan. 13, 1925.
D. S. LEONARDOS
1,523,223
FISHING TACKLE ACCESSORY
Filed Jan. 29, 1924
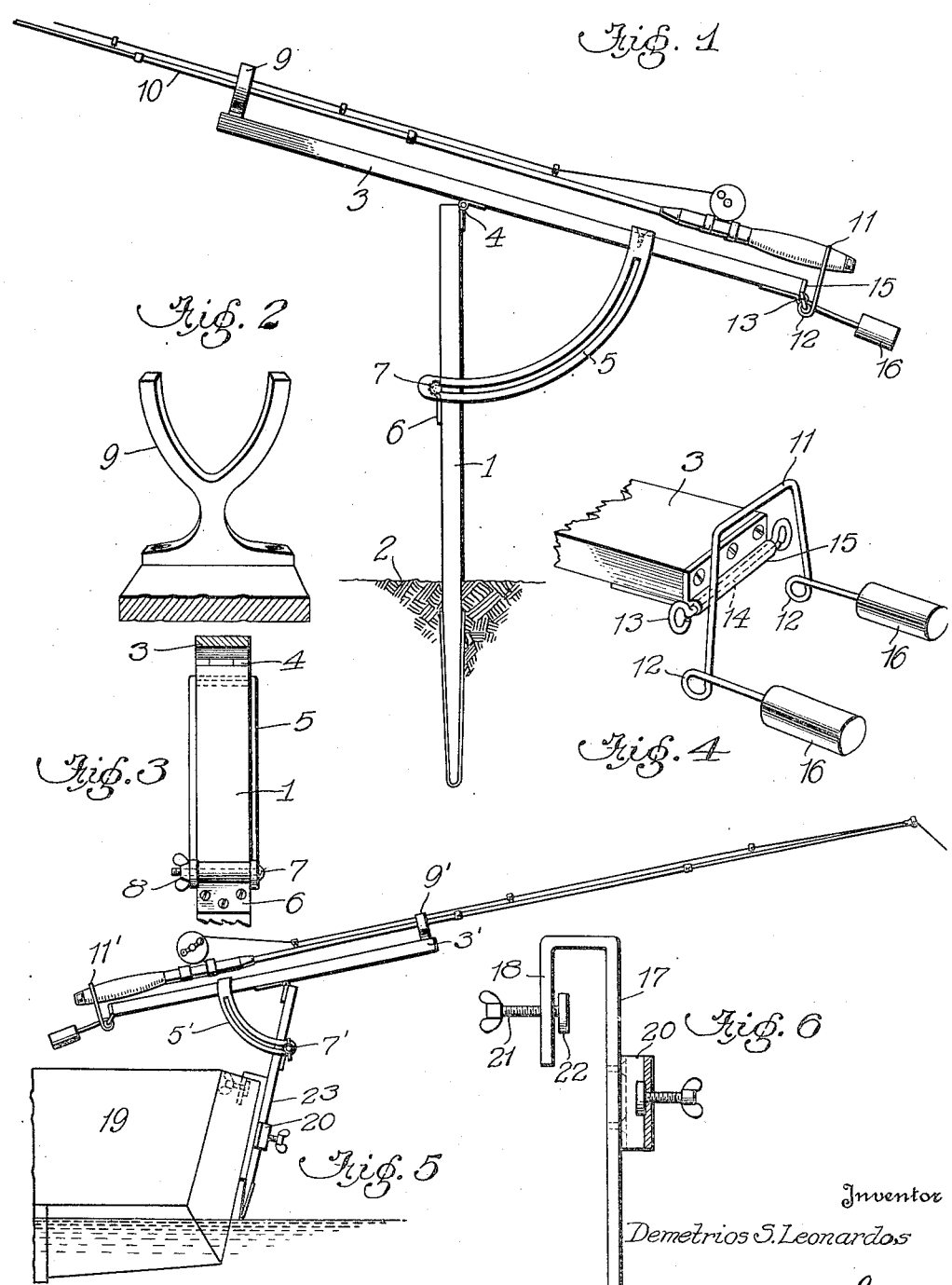
Inventor
Demetrios S. Leonardos
By William C. Liston
Attorney Patented Jan. 13, 1925.

1,523,223

UNITED STATES PATENT OFFICE.

DEMETRIOS S. LEONARDOS, OF SHREVEPORT, LOUISIANA.

FISHING-TACKLE ACCESSORY.

Application filed January 29, 1924. Serial No. 689,366.

*To all whom it may concern:*

Be it known that I, DEMETRIOS S. LEONARDOS, a citizen of the United States of America, residing at Shreveport, in the parish of Caddo and State of Louisiana, have invented certain new and useful Improvements in Fishing-Tackle Accessories; and I do hereby declare that the following is a full, clear, concise, and exact description of the invention, such as will enable others skilled in the art to which it appertains to make and use the same.

This invention relates to improvements in fishing tackle accessories, having for an object to provide a novel form of fishing rod holder or support, whereby a fishing rod will be adjustably supported upon the same in position such as will ensure proper disposition of a fishing line extending therefrom and permit the user of the device to give attention to other matters.

It is likewise an object of the invention to provide a device of the character mentioned employing a rod butt or handle retaining catch which may be instantly and conveniently disengaged therefrom, as when a fish has "struck" and the fisherman desires to remove the rod from the support to properly handle it and bring about the landing of the catch.

Other objects of the invention will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

In these drawings:

Figure 1 is a side elevation of the improved support;

Figure 2 is a perspective view of the forked supporting bracket;

Figure 3 is a vertical fragmentary section through the improved support;

Figure 4 is an enlarged perspective view of the improved catch;

Figure 5 is a side elevation of a slightly modified form of support; and,

Figure 6 is an enlarged detail, partly in section, of a modified form of supporting bracket.

Having more particular reference to the drawings, in connection with which like characters of reference will designate corresponding parts throughout, the improved support may be stated to comprise a standard indicated by the numeral 1, the lower end thereof being reduced, whereby to permit its ready insertion in the terrain 2, while upon the upper end thereof an arm 3 is hingedly mounted, as indicated by the numeral 4.

To effect temporary securing of the hingedly mounted arm 3 in an adjusted position with respect to the supporting standard 1, an arcuate guide bracket 5 is provided, comprising a pair of substantially parallel arcuate arms formed with slots extending approximately throughout their lengths and adapted to embrace an intermediate portion of the standard 1, as shown in the Figure 1; the basal portion of such bracket 5 being provided with suitable screw receiving or fastening receiving openings whereby said bracket may be fixedly secured to a portion of the arm 3. Secured to an upper portion of the standard 1 through the medium of a bracket 6 is a bolt 7 having a wing nut 8 turned into engagement therewith. This bolt 7 is adapted to pass through the elongated slots formed in the spaced legs of the bracket 5 and obviously, with tightening of the wing nut 8 thereupon, a binding connection as between it and the guide bracket 5 will be effected, thereby locking said bracket 5 against further movement with respect to the standard 1 and in consequence, effecting positive positioning of the arm 3 as adjusted by a user of the device.

Fixedly mounted upon the forward end of the arm 3 is a transversely positioned forked supporting bracket 9, adapted to receive an intermediate portion of a fishing rod 10 thereupon, while a substantially inverted U-shaped catch or bail-like device 11 is arranged adjacent the rearward end of the arm 3, being formed of a single length of wire bent upon itself and having loops 12 formed therein whereby to permit the engagement of eyelets 13 formed upon the opposite end of a connecting and supporting link 14 therewith; said supporting link 14 being engaged in the bearing portion of an angle bracket 15 fixedly secured by screws or other suitable fastening devices to said rearward end of the arm 3. The free extremities of the catch 11 are extended laterally and diagonally from the body portion thereof, as shown in the Figure 1, and carry weights 16 thereupon, these weights 16, obviously, causing the bail-like catch 11 to normally have a downward pull imparted thereto. Thus, with arrangement of the fishing rod 10 upon the supporting bracket 9 and the handle or butt portion thereof extending slightly beyond the rearward end of the arm 3, said catch 11 when engaged over said handle or butt portion will have binding engagement with an adjacent part thereof because of the downward pull imparted to the same through the medium of the weighted devices 16. In this way, it will be understood that the handle or butt portion of the rod 10 will be retained in a properly supported position upon the arm 3; the weighted devices 16 being such as to act as counterweights to the forwardly disposed portions of the rod 10.

In the figure, I have shown a slightly modified form of the support, wherein the same is especially fitted for use in connection with a boat or the like. In this particular embodiment of the invention, instead of the standard 1 described in connection with the preceding embodiment of the invention, the device is equipped with an attaching bracket indicated in its entirety by the numeral 17, said bracket consisting of a strip or length of suitable material, such as scrap metal or the like, having the upper end thereof bent to provide an angular engaging arm or portion 18, which portion is adapted to be engaged over the gunwales of a boat such as indicated fragmentally by the numeral 19. A substantially U-shaped or channeled guide bracket 20 is bolted, riveted, or otherwise secured to the intermediate portion of this bracket 17 and has a locking screw 21 turned into engagement with a screw threaded opening formed in the outer side thereof; the inner end of such screw being reduced and carrying a disc 22 thereupon, adapted to have binding engagement with an adjacent portion of a supporting bar or rod 23 passing between the brackets 17 and 20. Thus, said bar or rod 23 will be fixedly secured in an adjusted position with respect to the boat 19.

Upon the upper end of the bar or rod 23, there is hingedly mounted an arm 3' corresponding to the arm 3 shown in the first embodiment of the invention, while the oppositely disposed arcuate legs of a guide bracket 5' are adapted to embrace the opposite sides of said bar or rod 23 and to be adjustably connected thereto through the medium of an adjusting and locking bolt 7'.

A rod supporting bracket 9' is fixedly positioned upon the forward end of the arm 3', while a catch 11' is mounted upon the rearward end of such arm 3', whereby to effect the releasable positioning of the fishing rod thereupon.

In using the improved supporting device, the rod supporting arm thereof is adjusted to the desired angular position through the medium of the guide bracket 5 or 5', the adjusting and locking bolt therefor being tightened so as to effect the securing of such arm in a fixed adjusted position with respect to its standard 1 or 23. At this time, the fishing rod 10 is arranged upon the forked transversely arranged supporting bracket, the rearward or handle portion thereof extending for a distance beyond the rearward end of the supporting arm 3 whereby to permit engagement of the bail-like catch with the same. As hereinbefore stated, because of the downward pull imparted to said catch through the medium of the weighted devices 16, said catch 11 will have binding engagement with an adjacent portion of the rod butt or handle and in consequence, will retain the same in a supported position upon the device. However, when it is desired to remove the rod 10, as when a fish has "struck," the fisherman need only grasp the handle of the rod 10 and move the same slightly downwardly, thus permitting the bail-like catch device 11 to swing downwardly under influence of the weighted devices 16 and be thus disengaged with the fishing rod handle. At this time, the rod may be immediately removed from the forked supporting bracket 9 and handled in a manner such as to effect landing of the catch.

Manifestly, the construction shown is capable of considerable modification, and such modification as is within the scope of my claims, I consider within the spirit of my invention.

I claim:

1. A fishing rod support comprising a standard, an arm adjustably mounted upon said standard, a bracket on one end of the arm, a link having loops formed in its opposite ends secured to and arranged transversely of the remaining end of the arm, and a catch formed of a single length of material bent into substantially U-shaped formation, the side portions of which are looped and formed with angularly extended weighted extremities, the looped portions of said sides pivotally engaging the looped ends of said links and the basal portion of the catch extending transversely of said arm and normally arranged above the same.

2. A fishing rod support comprising a standard, an arm adjustably mounted upon said standard, a bracket on one end of the arm, a link having the opposite ends thereof looped, arranged transversely of and secured to the opposite end of the arm, and a catch formed of a single length of wire bent into substantially inverted U-shaped formation, the opposite side portions of which are provided with loops at their intermediate portions and formed with right angularly extended weighted extremities, said right angularly extended weighted extremities being arranged in substantial parallelism to the opposite sides of said arms, the looped portions of the opposite sides pivotally engaging the looped ends of said link and the basal portion of the catch extending transversely of the arm and normally arranged above the same.

In witness whereof I have hereunto set my hand.

DEMETRIOS S. LEONARDOS.